May 1, 1928.
S. M. McCONNELL
HEATING APPARATUS
Filed April 28, 1927
1,668,417
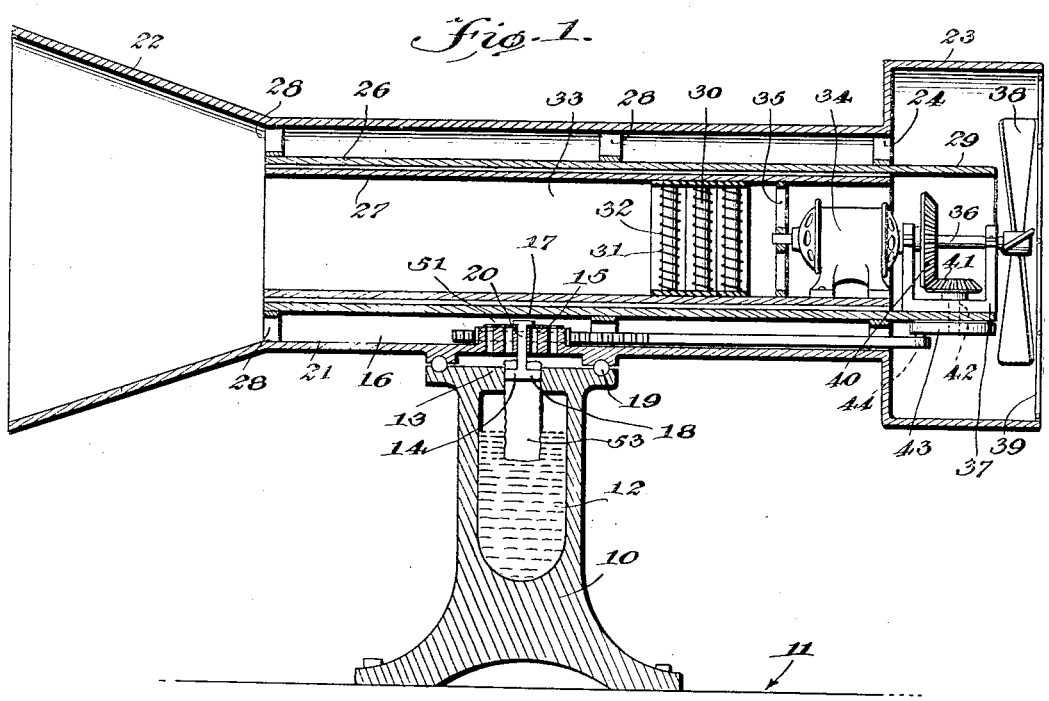
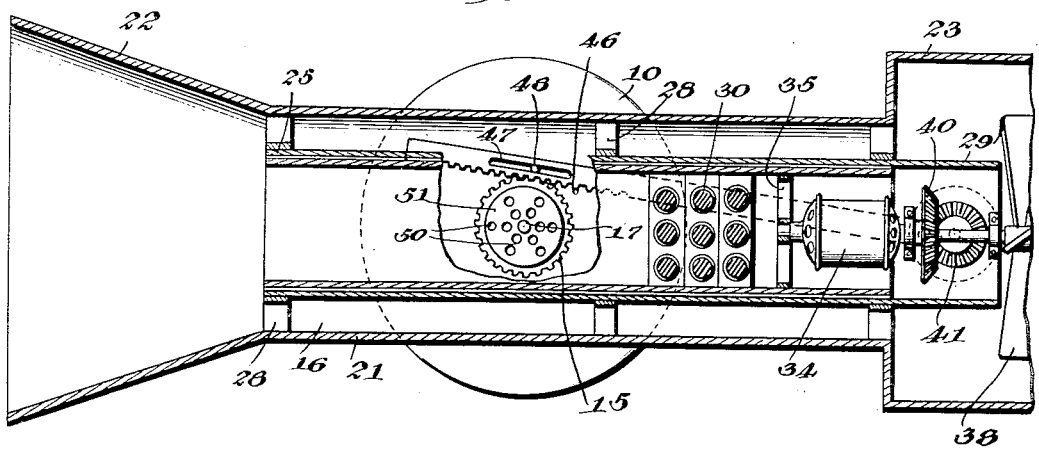
INVENTOR
S. M. McConnell Patented May 1, 1928.

1,668,417

UNITED STATES PATENT OFFICE.

SAMUEL MASON McCONNELL, OF TAMPA, FLORIDA.

HEATING APPARATUS.

Application filed April 28, 1927. Serial No. 187,235.

This invention relates to portable electric heaters for rooms.

An object of the invention is the provision of a portable device adapted to be placed on a table in a room and which will economically heat a space due to the fact that a forced air draft is maintained at all times and the air is distributed to all parts of the room.

Another object of the invention is the provision of a neat and compact portable electric heater having included therein means for not only distributing the heat to various parts of a room but for intensifying the heat before distribution.

A further object of the invention is the provision of a portable electric heater in which a fan is driven by a motor, disposed within the heater, the motor having connections with a heated air distributing device for oscillating the device so that all parts of a room will receive said heated air.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a vertical section of my improved electric heater,

Figure 2 is a horizontal section of the heater.

Referring more particularly to the drawings 10 designates a pedestal adapted to be placed upon a table 11 in a room and provided with a chamber 12 for storing water which is evaporated and distributed with the air in predetermined quantities. The top of the chamber is closed at 13 except for an opening 14 through which the vapors escape. A perforated gear 15 on the top of the pedestal places an annular air chamber 16 in communication with the opening 14.

The gear is mounted for revolution on an axle 17 formed integrally with a spider 18 secured or formed integrally with the upper end of the pedestal 10. The gear revolves on ball bearings 19 in a race formed in the top of said pedestal. A nut 20 secures the gear and a casing 21 together.

The casing has a flared discharge 22 at one end for distributing the heated air to the room. The other end of the casing has a fan housing 23 of greater cross sectional area than the casing and is in open communication with the chamber 16 of said housing through the annular port 24. The chamber 16 is restricted by a central casing 25 telescoped within the casing 21.

The inner casing has an outer shell or lining 26 of asbestos and an inner shell 27 formed of metal such as tin or copper and has its inner surface highly polished to provide a reflector. The combined shells 26 and 27 are supported concentrically of the casing 21 by spaced fins 28.

The shell 26 extends into the housing 23 as shown at 29. A heating unit 30 is located within the shell 27 adjacent one end and consists of the well known form of resistance wires 31 coiled around insulating tubes or cylinders 32 formed of fire-resistant material. The heating unit is so formed that it will permit the passage of air through the heating chamber 33.

A motor 34 is mounted in the chamber 33 and a contact ring 35 is connected with the house current for causing energization of the motor. The motor drives a shaft 36 which is mounted in bearing in a bracket 37 secured to the inner shell 27. The shaft extends into the housing 23.

A fan 38 is secured to the outer end of the shaft and is disposed in the housing 23. A screen or protective cover 39 is secured to the outer end of the housing 23 and permits air to be drawn into the housing which is forced by the fan 38 through the heating chamber 33 and the chamber 16 to the flared discharge end 22 where the air is distributed to the room as will be presently described.

A gear 40 is rigid with the shaft 36 and drives a gear 41 rigid with a shaft 42 which drives a disk 43 located exteriorly of the casing 25. A crank pin 44 is secured eccentrically to the disk 43.

A rod 45 has one end pivoted on the pin 44, the other end of the rod being provided with a rack 46 meshing with the gear 15. Since the rod 45 is reciprocated, while at the same time the rack is maintained in mesh with the gear 15 means are provided in the form of a slot 47 in the rack and a pin 48 received by the slot for guiding the rod. The pin is secured to the casing 25.

The operation of my device is as follows:—

The heating coils and the motor are connected to the usual house current and controlled by a switch not shown. As the motor is driven it causes rotation of the fan 38 which draws in the air through the screen 39 and forces said air through the chambers 16 and 33. The air is heated by the units 30 and is distributed to the room through the flared member 22. The heated air passing over the openings 50 in the gear 15 cause the vapor from the chamber 12 to be evacuated from said chamber and carried by the air to the room. A valve 51 controls the quantity of moisture delivered to the air.

The rotating disk 43 through the crank pin 44 reciprocates the rod 45 causing rotation of the gear 15. Since this gear is rigid with the casing 21, said casing is oscillated on the pivot 17 so that the hot air issuing from the funneled or flared member 22 is distributed to all parts of the room in which the heater is located.

A wick 53 has its inner end located in the water chamber 12 and its upper end projecting above the top of the pedestal so the moisture is progressively supplied to the air.

I claim:

1. An electric heater comprising an open ended casing mounted for oscillation, means for oscillating said casing, a heater located within the casing for heating air in the casing, said oscillating means including a motor mounted within the casing a reflector in the casing and embracing the heater.

2. An electric heater comprising an open ended casing mounted for oscillation, means for oscillating said casing, a heater located within the casing for heating air in the casing, said oscillating means including a motor mounted within the casing a reflector in the casing and embracing the heater said reflector being cylindrical and spaced from the casing.

3. An electric heater comprising an open ended casing mounted for oscillation, means for oscillating said casing, a heater located within the casing for heating air in the casing, said oscillating means including a motor mounted within the casing and a fan driven by the motor for forcing air through the casing, said casing having a flared discharge between the fans and said discharge end, the heater being disposed between the fans and said discharge end.

4. A heater comprising a pedestal, an open ended casing mounted for oscillation on the pedestal, a heater located within the casing for heating air in said casing, a tank for water in the pedestal and means for placing the tank in communication with the casing.

5. A heater comprising a pedestal, an open ended casing mounted for oscillation on the pedestal, a heater located within the casing for heating air in said casing, a tank for water in the pedestal and means for causing oscillation of the casing.

6. A heater comprising a pedestal, an open ended casing mounted for oscillation on the pedestal, a heater located within the casing for heating air in said casing, a tank for water in the pedestal and means for causing oscillation of the casing, said oscillating means including a motor, a reciprocating rack, a gear rigid with the casing and in mesh with the rack, and operative connections between the rack and the motor for causing reciprocation of the rack.

SAMUEL MASON McCONNELL.